Figure 1:
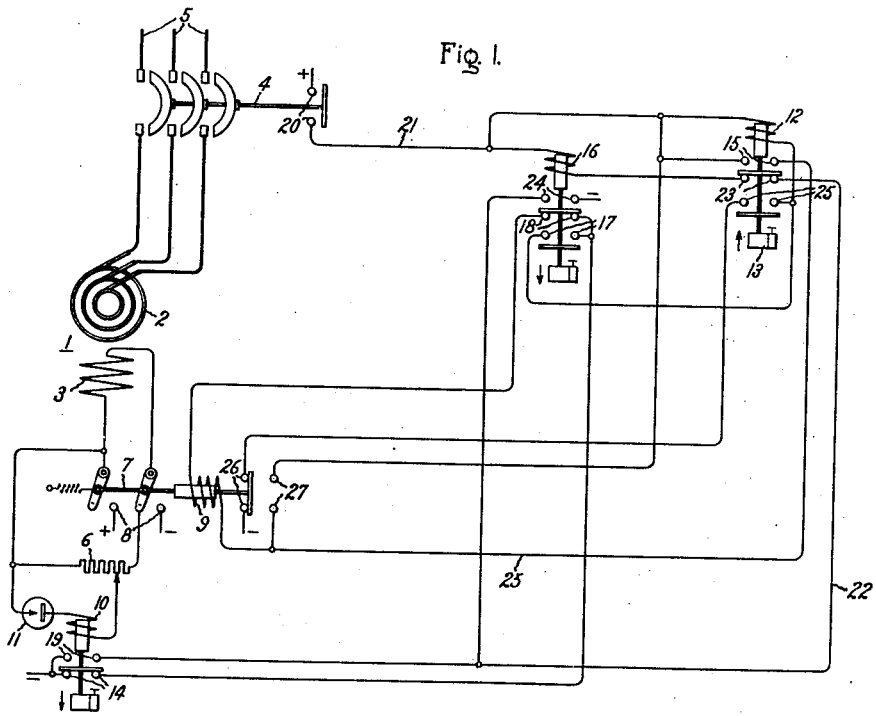

Jan. 17, 1939.　　　M. N. HALBERG　　　2,144,530
MOTOR CONTROL SYSTEM
Filed May 22, 1935

Inventor:
Maynord N. Halberg,
by Harry E. Dunham
His Attorney.

Patented Jan. 17, 1939

2,144,530

UNITED STATES PATENT OFFICE 2,144,530

MOTOR CONTROL SYSTEM

Maynord N. Halberg, Schenectady, N. Y., assignor to General Electric Company, a corporation of New York Application May 22, 1935, Serial No. 22,801

11 Claims. (Cl. 171—118)

My invention relates to motor control systems and particularly to systems for controlling the application of the direct current excitation to a synchronous motor field winding.

One object of my invention is to provide an improved arrangement of apparatus for connecting a synchronous motor field winding to a source of excitation so that the motor pulls into step, upon the application of the direct current excitation to the field winding, without any substantial surges occurring in the motor armature current due to the motor slipping one or more poles during the synchronizing operation.

In certain synchronous motor installations, the load connected to the motor is of such size and character that the motor can develop sufficient pull-in torque to pull itself into step in response to the application of direct current to its field winding only when the direct current is applied at just the right part of the slip cycle of induced field current. This particular part of the slip cycle depends upon the characteristics of the motor. Also the operating time of the field switching means has to be taken into consideration in determining when the operation of the switching means should be initiated in order to effect the connection of the source of direct current excitation at the proper time.

In accordance with the invention covered by my copending application, Serial No. 721,481, filed April 20, 1934, and assigned to the same assignee as this application, I accomplish the desired result of applying excitation to the synchronous motor at the most favorable point in the slip cycle of induced field current by providing an arrangement for initiating, at the end of a predetermined half-cycle of induced field current of a predetermined frequency, the operation of suitable timing means which, after being in operation for a predetermined time, effect the operation of suitable switching means to connect the source of excitation to the motor field winding. With such an arrangement, it is necessary to change the time of operation of the timing means in accordance with the sub-synchronous speed at which it is desired to apply excitation to the motor. For example, if it is desired to change the speed at which the excitation is to be applied from 96% of synchronous speed to 98% of synchronous speed, it is necessary to change the setting of both the frequency responsive means and the timing means in order that the excitation may still be applied at the proper point on the slip cycle of induced field current. It is rather a difficult job for an unskilled motor attendant to make these various adjustments in the proper manner.

In accordance with my present invention, I provide a modification of my prior arrangement so that it is necessary to change only the setting of the frequency responsive means whenever it is necessary to change the speed at which the excitation is to be applied.

Figure 2:
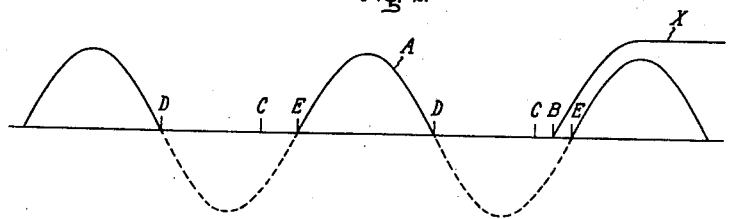
Figure 3:
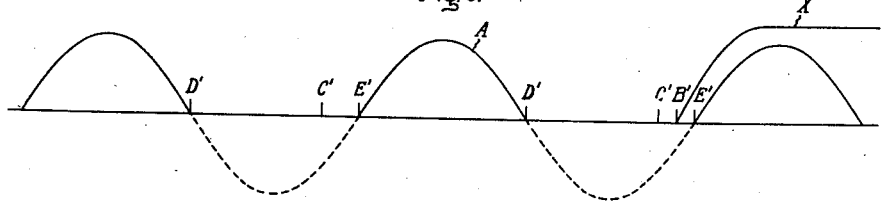

My invention will be better understood from the following description when taken in connection with the accompanying drawing, Fig. 1 of which diagrammatically shows a synchronous motor starting system embodying my invention and Figs. 2 and 3 of which show explanatory curves and its scope will be pointed out in the appended claims.

Referring to Fig. 1 of the drawing, 1 represents a synchronous motor which is provided with an armature winding 2 and a field winding 3.

In order to simplify the disclosure, I have shown my invention in connection with a full voltage starting arrangement for a synchronous motor so that it is started by connecting the armature winding 2, by means of a suitable manually controlled switch 4, directly across an alternating current supply circuit 5 while the field winding 3 is short-circuited through a discharge resistor 6. Therefore, normal supply circuit voltage is supplied to the motor armature winding to start the motor as an induction motor. In practice the motor also will usually have a squirrel cage winding, which is not shown. While I have shown a full voltage starting equipment, it will be understood that any other well-known synchronous motor starting equipment may be employed to start the motor from rest and accelerate it to approximately synchronous speed.

The connection of the field winding 3 to the discharge resistor 6 is completed by means of a two-position field switch 7 when it is in the position shown in the drawing. When the switch 7 is in its other position, the discharge resistor 6 is disconnected from the field winding 3 and field winding 3 is connected to a suitable source of excitation 8. Switch 7 is provided with an operating winding 9 which, when energized, moves the switch 7 from the position in which it is shown to its other position in which the source of excitation 8 is connected to the field winding 3.

For controlling the energization of the operating winding 9 of the switch 7 so that it is energized at that part of the slip cycle of induced field current which will produce the most favorable synchronizing operation, I employ the field application relay arrangement disclosed in United States Letters Patent 1,958,250, granted May 8, 1934, to Harold T. Seeley, assignor to the same assignee as this application. I have this relay arrangement initiate the operation of suitable timing means which, when operated continuously for a definite length of time, establishes certain connections whereby an energizing circuit for the operating winding 9 is completed at a definite time before the end of the next predetermined half cycle of induced field current. This field application relay arrangement preferably consists of a time relay 10 and a half wave rectifier 11 connected in series across a portion or all of the discharge resistor 6. With such an arrangement, the induced current which flows through the motor field winding 3, while the motor 1 is operating below synchronous speed, causes the relay 10 to pick up and remain in its picked up position until the motor reaches a predetermined subsynchronous speed at which time the frequency of the induced current becomes so low that the half cycle during which no current flows through the relay winding is long enough to allow the relay to return to its normal position at the end of that half cycle of slip frequency current. Each time the relay 10 is restored to its normally deenergized position it initiates the operation of a suitable timing means, which has a predetermined definite time of operation. When the motor reaches a predetermined higher subsynchronous speed so that the relay 10 remains in its deenergized position for a sufficient length of time to allow the timing means to complete its timing operation, the timing means establishes the necessary connections so that the next time the relay 10 is restored to its normally deenergized position, an energizing circuit is completed for the operating winding 9 of the field switch 7 to connect the source of excitation 8 to the motor field winding 3.

In the arrangement shown the timing means is a definite time relay 12 which, when its winding is energized, does not leave its normally deenergized position until its winding has been continuously energized for a predetermined definite time, and which, when deenergized, returns substantially immediately to its normally deenergized position. This predetermined definite time may be obtained in any suitable manner and as shown in the drawing is obtained by means of an adjustable dash-pot 13 connected to the movable element of the relay. The circuit of the time relay 12 is arranged to be completed when the contacts 14 of the relay 10 are closed after the motor has reached a predetermined speed and to be deenergized when these contacts are open. The relay 12, in turn, is provided with contacts 15 which are connected in an energizing circuit for the operating winding 9 of the switch 7 and which are closed when the relay 10 maintains its contacts 14 continuously closed for a predetermined definite time interval after the motor has been started.

In order to insure that the field switch 7 is not closed until after the motor 1 has been started and the relay 10 has had time to open its contacts 14, I provide a relay 16 which has its contacts 17 connected in series with the contacts 14 of relay 10 and the operating winding of relay 12. The circuit of relay 16 is controlled by the relay 10 so that relay 16 cannot be energized to close its contacts 17 until after the relay 10 has closed its contacts 19. The relay 16 is designed in any suitable manner so that it immediately closes its contacts 17 and 24 and opens its contacts 18 when the winding of the relay is energized but does not open its contacts 17 and 24 nor close its contacts 18 until a predetermined time has elapsed after the winding is deenergized.

The relay 16, when in its normally deenergized position, also has its normally closed contacts 18 connected in series with the operating winding 9 of the switch 7 so that this switch can be closed only when relay 16 is in its normally deenergized position.

The operation of the arrangement shown in the drawing is as follows: When it is desired to start the motor 1, the switch 4 is closed so that the full voltage of the circuit 5 is applied to the armature winding 2 to start the motor 1 from rest and accelerate it to approximately synchronous speed. As soon as the motor armature winding 2 is energized, a voltage of slip frequency is induced in the motor field winding 3 and this voltage causes a current of slip frequency to flow through the field winding 3 and the discharge resistor 6 and a pulsating current to flow through the rectifier 11 and the winding of relay 10. Until the motor reaches substantially synchronous speed, the magnitude and periodicity of the rectified current through the winding of relay 10 are such that this relay picks up and maintains its contacts 14 open and its contacts 19 closed. As soon as the contacts 19 close, a circuit is completed for the operating winding of the relay 16. This circuit is from one side of a suitable control circuit through auxiliary contacts 20 on the circuit breaker 4, conductor 21, winding of relay 16, contacts 23 of relay 12, conductor 22, and contacts 19 of relay 10 to the other side of the control circuit. By closing its contacts 24, relay 16 completes a shunt circuit around the contacts 19 of relay 10 so that the relay 16 remains energized when the contacts 19 are subsequently open.

When the motor reaches a predetermined subsynchronous speed, the frequency of the induced current through the field winding 3 and the resistor 6 becomes so low that the time interval of each half cycle during which substantially no current flows through the winding of relay 10 is long enough to allow the relay to return to its normally deenergized position. Each time the relay 10 closes its contacts 14, an energizing circuit is completed for the winding of the time relay 12 through the auxiliary contacts 20 on the circuit breaker 4, conductor 21, winding of relay 12, contacts 17 of relay 16, and contacts 14 of relay 10. However, relay 12 is not energized for a sufficient length of time to effect the operation thereof until the motor reaches a higher predetermined subsynchronous speed at which time the contacts 14 remain closed during each half cycle of induced field current of a predetermined direction long enough to effect the operation of the relay 12. By closing its contacts 25, the relay 12 completes a locking circuit for itself through the auxiliary contacts 26 on the field switch 7. By opening its contacts 23, the relay 12 opens the energizing circuit for the winding of relay 16 so that this relay opens its contacts 17 and 24 and closes its contacts 18 after a predetermined time interval which is sufficient to allow the relay 10 to be picked up by the next half cycle of induced field current. By closing its contacts 15, relay 12 prepares an energizing circuit for the closing coil 9 so that the next time the relay 10 closes its contacts 14 after the relay 12 is energized, the operating winding 9 is energized to close the switch 7 and connect the source of excitation 8 to the field winding 3. This energizing circuit for winding 9 includes the auxiliary contacts 20 on the circuit breaker 4, conductor 21, contacts 15 of relay 12, contacts 18 of relay 16 and contacts 14 of relay 10. By closing its auxiliary contact 27, the field switch 7 completes a shunt circuit around the contacts 15 of the relay 12 so that the operating winding 9 remains energized when the relay 12 opens its contacts 15 after the holding circuit for the relay 12 is opened by the auxiliary contacts 26 on the field switch 7.

Figs. 2 and 3 illustrate more clearly how my improved arrangement effects the application of the excitation to the motor at the most favorable point on the cycle of slip frequency current through the field winding. In both of these figures, the curve A illustrates the induced current of slip frequency that flows through the field winding when the motor is operating at a predetermined subsynchronous speed from which it is desired to synchronize the motor, the speed in Fig. 2 being lower than the speed in Fig. 3. The solid portions of the curves A represent the half-waves of induced current during which current flows through the rectifier 11 and the winding of relay 10 and the dotted portions represent the half-waves of induced current during which no current flows through the winding of relay 10.

In Fig. 2 it is assumed that point B represents the ideal point at which the excitation should be applied when the motor is to be synchronized at a speed which produces an induced field current corresponding to the curve A shown in this figure. In order that this result may be accomplished, it is necessary to complete the energizing circuit for the operating coil 9 of the field switch 7 at some predetermined time interval prior to the point B, such for example as point C. Points D and E respectively represent the beginning and end of the half-cycle of induced field current that flows in the opposite direction to that in which the direct current flows when the source of excitation is connected to the field winding. Curve X shows how the direct current builds up in the field winding when the field switch 7 closes. By adjusting the setting of the relay 10 so that its time of operation, when deenergized, is equal to the time interval DC, and by adjusting the setting of the time relay 12 so that its time of operation, when energized, is equal to the time interval CE, it will be seen that when the motor reaches the desired speed from which it is to be synchronized, the time interval DE, during which no current flows through the winding of relay 10, is long enough to effect the operation of the relay 12. After the time relay 12 operates, the circuit of the operating coil 9 of the field switch 7 is completed by relay 10 the next time it closes its contacts 14 which occurs a definite time interval CE before the end of the next half cycle of induced field current which does not flow through the relay 10. Since the time interval CB represents the time of operation of the field switch 7, this switch closes at the point B, which is the ideal point at which the field excitation should be applied.

It will now be assumed that it is desired to have the arrangement shown in Fig. 1 synchronize the motor from a higher subsynchronous speed, such for example as speed which exists when the induced field current has the frequency shown in Fig. 3. This result is obtained by merely adjusting, in any well known manner, examples of which are well known in the art, the setting of the relay 10 so that it has to be deenergized for a time interval D'C' instead of the time interval DC before it can close its contacts 14. With this new adjustment of the relay 10, it is evident that the motor speed has to increase to a higher value in order for the relay 10 to maintain its contacts 14 closed for the time interval C'E' to effect the operation of the relay 12. Since the time intervals C'E' and C'B' are respectively equal to the time intervals CE and CB in Fig. 2, it is evident that the time intervals BE and B'E' are also equal and consequently the excitation is applied at the same definite time prior to the end of the half-cycle of induced field current as in Fig. 2 which is substantially the best point on the slip cycle of induced field current for the excitation to be applied. Therefore, with the arrangement shown in Fig. 1, excitation is always applied at the best point on the slip cycle of induced field current by having it always applied at a predetermined definite time interval prior to the end of a particular half-cycle of induced field current and this time interval is independent of the speed from which the motor is being synchronized.

By means of my improved control arrangement, it will be seen that after the setting of the time relay 12 has once been properly made at the factory for a given motor, the changing of the setting of the frequency responsive relay 10 by a motor operator to effect a change in the speed from which the motor is to be synchronized does not materially change the point on the slip cycle of induced field current at which excitation is applied.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent in the United States is:

1. In a motor control system, an alternating current circuit, a synchronous motor having an armature winding connected to said circuit and a field winding, a source of excitation for said field winding, means operative at the end of a half cycle of induced current through said field winding of a predetermined direction and predetermined duration, and means controlled by said induced current responsive means for effecting the connection of said source of excitation to said field winding in response to a subsequent half cycle of induced field current of a predetermined direction.

2. In a motor control system, an alternating current circuit, a synchronous motor having an armature winding connected to said circuit and a field winding, a source of excitation for said field winding, means operative at the end of a half cycle of induced current through said field winding of a predetermined direction and predetermined duration, and means controlled by said induced current responsive means for effecting the connection of said source of excitation to said field winding in response to a subsequent half cycle of induced field current of a predetermined direction and duration.

3. In a motor control system, an alternating current circuit, a synchronous motor having an armatue winding connected to said circuit and a field winding, a source of excitation for said field winding, means responsive to a half cycle of induced current through said field winding of a predetermined direction and predetermined duration, and means controlled by said induced current responsive means for effecting the connection of said source of excitation to said field winding in response to the next half cycle of induced field current of said predetermined direction having a duration equal to or greater than a predetermined portion of said predetermined duration.

4. In a motor control system, an alternating current circuit, a synchronous motor having an armature winding connected to said circuit and a field winding, a source of excitation for said field winding, means responsive to a half cycle of induced current through said field winding of a predetermined direction and predetermined duration, and means controlled by said induced current responsive means for connecting said source of excitation to said field winding in response to the next half cycle of induced field current of said predetermined direction at a definite time prior to the end of said next half cycle.

5. In a motor control system, an alternating current circuit, a synchronous motor having an armature winding connected to said circuit and a field winding, a source of excitation for said field winding, timing means having a definite time of operation, means for initiating the operation of said timing means a predetermined time after the beginning of each half cycle of induced current of a predetermined direction in said field winding and for maintaining it in operation during the remaining portion of each such half cycle, and means controlled by said timing means for connecting said source of excitation to said field winding a predetermined time before the end of the next half cycle of induced current of said predetermined direction after said timing means has completed its timing operation.

6. In a motor control system, an alternating current circuit, a synchronous motor having an armature winding connected to said circuit and a field winding, a source of excitation for said field winding, a definite time relay, means for energizing said relay during the time duration of each half cycle of induced current of a predetermined direction in said field winding in excess of a predetermined time, and means controlled by said relay when continuously energized for a predetermined time for connecting said source of excitation to said field winding a predetermined time before the end of the next half cycle of induced current of a predetermined direction.

7. In a motor control system, an alternating current circuit, a synchronous motor having an armature winding connected to said circuit and a field winding, a source of excitation for said field winding, a field switch for connecting said source to said field winding, means including an operating winding for closing said field switch in responsive to the energization of said operating winding, a definite time relay, means for energizing said relay during that portion of the time duration of each half cycle of induced current of a predetermined direction in said field winding which is in excess of a predetermined time interval, and means controlled by said relay for completing an energizing circuit for said operating winding a predetermined time prior to the end of the first half cycle of induced current of said predetermined direction after said relay has been continuously energized for a predetermined time.

8. In a motor control system, an alternating current circuit, a synchronous motor having an armature winding connected to said circuit and a field winding, a source of excitation for said field winding, a field switch for connecting said source to said field winding, means including an operating winding for closing said field switch in response to the energization of said operating winding, a half wave rectifier and a time relay connected in series with said field winding, a second time relay, means controlled by said first time relay when deenergized for a predetermined time for completing an energizing circuit for said second time relay, means controlled by said second time relay when continuously energized for a predetermined time for completing a holding circuit for itself, and means controlled by said time relays for completing an energizing circuit for said operating winding the next time said first mentioned time relay is deenergized for said predetermined time after said second time relay has completed the holding circuit for itself.

9. In a motor control system, an alternating current circuit, a synchronous motor having an armature winding connected to said circuit and a field winding, a source of excitation for said field winding, means adapted to be adjusted to respond to different predetermined speeds of said motor, and means responsive to the operation of said speed responsive means for effecting the connection of said field winding to said source at a time interval prior to the end of a half cycle of induced current flowing in a predetermined direction in said field winding and substantially constant for all speed adjustments of said speed responsive means.

10. In a motor control system, an alternating current circuit, a synchronous motor having an armature winding connected to said circuit and a field winding, a source of excitation for said field winding, means adapted to be adjusted to respond to different predetermined frequencies of the induced current flowing in said field winding, and means responsive to the operation of said frequency responsive means for effecting the connection of said field winding to said source at a time interval prior to the end of a half cycle of induced current flowing in a predetermined direction in said field winding and substantially constant for all frequency adjustments of said frequency responsive means.

11. In a motor control system, an alternating current circuit, a synchronous motor having an armature winding connected to said circuit and a field winding, a source of excitation for said field winding, means adapted to be adjusted to respond to different predetermined frequencies of the induced current flowing in said field winding, and means responsive to the operation of said frequency responsive means for effecting the connection of said field winding to said source at a time interval prior to the end of a half cycle of induced current flowing in a predetermined direction and for a predetermined duration in said field winding, said time interval being substantially constant for all frequency adjustments of said frequency responsive means.

MAYNORD N. HALBERG.